Patented Jan. 15, 1952

2,582,569

UNITED STATES PATENT OFFICE 2,582,569

SILICON-CONTAINING ALCOHOLS

John Leopold Speier, Jr., Pittsburgh, Pa., assignor to Dow Corning Corporation, Midland, Mich., a corporation of Michigan No Drawing. Application July 2, 1948, Serial No. 36,814. In Great Britain August 26, 1947

3 Claims. (Cl. 260—448.2)

The present invention relates to the production of primary alcohols which are substituted with organosilicon radicals in the alpha position.

The chemistry of the organosilicon compounds has been to a large extent, for many years past, a thing apart from organic chemistry. In the previous work on the organosilicon compounds, the major development has been in silanes and siloxanes substituted with hydrocarbon radicals on the silicon and in which the functional bonds were between the silicon and atoms linked directly thereto. The fact that the primary functionality of these materials was directly associated with the silicon, resulted in the major development work centering around hydrolyzable silanes and around variations in the geometry of the skeleton of the siloxane molecules derived by hydrolysis thereof. These materials were free of functionality other than that inherent in siloxane bonds.

Objects of the present invention are to provide methods for the production of primary organic alcohols of organosilicon materials.

In accordance with the present invention an organic ester which is substituted with an organo silyl radical in the alpha position of a primary alcohol is subjected to alcoholysis or hydrolysis. By this means the group linked to the silicon atom which contains an ester linkage in the group is converted to an hydroxymethyl group on the silicon atom.

The esters employed are of the type formula $R_nSi(CH_2Ac)_{4-n}$ in which R represents hydrocarbon radicals as indicated, $n$ represents an integer from 1 to 3 and Ac represents acyl.

The esters which are employed in the process of the present invention may be obtained in accordance with the process described in my specification filed simultaneously herewith, Serial Number 36,811. In accordance with the method there disclosed a chloromethyl silane is employed which is of the type formula $R_nSi(CH_2Cl)_{4-n}$ in which R represents hydrocarbonyl radicals and $n$ represents an integer from 1 to 3. This is interacted with a metal salt of a carboxylic acid in the presence of a solvent for this salt. Preferably the carboxylic acid in free state is employed as solvent. The chloromethyl silane which is employed for the production of the ester may be prepared in a variety of ways. Thus, the compound of this type in which R represents methyl may be prepared if desired, by the chlorination of tetramethyl silane. It may likewise be prepared by reacting a chloromethyl methyl silicon chloride with a methyl Grignard reagent. Other materials of this type may be prepared by reacting chloromethyl silicon chloride with any desired Grignard reagent to bond other hydrocarbon radicals to the silicon, though in some instances the yields are limited due to side reactions.

The hydrocarbon radicals in each of these types of compounds are preferably aryl such as phenyl, or alkyl such as methyl or higher alkyl, for example, octadecyl.

The esters above described are subjected to alcoholysis or hydrolysis in accordance with known procedures. Thus, the esters may be contacted with an alcohol or with water either in the presence of a hydrolysis catalyst, as for example, an acid or a base. In the case of alcoholysis, equally good results can be obtained either with an acid or a base. In connection with hydrolysis, it is preferred to employ a base, inasmuch as the acid produced by the hydrolysis is neutralized, causing the reaction to go more nearly to completion. It is also desirable to employ an excess either of the alcohol or water in order to obtain a more favorable equilibrium.

In the case of alcoholysis the reaction proceeds relatively slowly. In order to obtain the greatest yield possible from a given amount of the ester, it is desirable periodically to remove the ester of the alcohol employed in the alcoholysis. In plant operation, the reaction may be conducted in a cyclic manner. The hydroxymethyl silane product, the ester of the alcohol employed for alcoholysis, excess alcohol and unreacted ester of the hydroxymethyl silane are separated, with the latter being recycled to the operation.

The hydrolysis is quite rapid particularly when conducted in the presence of an alkali such as sodium or potassium hydroxide. The acid radical of the ester forms an organic salt with alkali metal when an alkali metal hydroxide is employed for hydrolysis. Products in accordance herewith are of the general formula $R_nSi(CH_2OH)_{4-n}$ in which R represents hydrocarbon radicals as indicated and $n$ represents an integer from 1 to 3 inclusive. Preferably R represents methyl.

Hydroxymethyl trimethyl silane produced in accordance with the method hereof has been found to be a desirable non-corrosive antiseptic. Higher molecular weight compounds of the type produced in accordance herewith may be employed as antifoaming agents either in hydrocarbon oils or in aqueous systems containing organic materials. The bis-hydroxymethyl silanes produced in accordance herewith are of utility in the production of resins. Thus, polyurethane and alkyd type resins may be produced from these alcohols, which are analogues of glycols.

These alcohols are very reactive and are, accordingly, the starting point for the preparation of a wide range of derivatives paralleling derivatives obtainable in organic chemistry from alcohols.

EXAMPLES

*Example 1*

210 parts by weight of anhydrous potassium acetate were dissolved in 420 parts of glacial acetic acid. The mixture was warmed and 244 parts of trimethyl chloromethyl silane were added. The mixture was heated under reflux for 16 hours. Some salt had been precipitated at this temperature. The mixture was then placed in a bomb and heated at 192° C. for 17.5 hours. The bomb was cooled and the contents were discharged. Potassium chloride had been formed and was present as gritty fine crystals. The mixture was washed with water until free of acids. 249.5 parts of product were obtained, which product was distilled. A large plateau was obtained at 136.2° C. under 748.2 mm. pressure. This product which was obtained in yield of over 92% theoretical was proven to be $(CH_3)_3SiCH_2OOCCH_3$. This material had an index of refraction at 25° C. of 1.4060, a specific gravity of 0.8667, a molar refraction of 41.37 and a saponification equivalent of 146.5. Analysis showed the compound to contain 19.2 per cent Si.

This ester was hydrolyzed with aqueous sodium hydroxide of 20 per cent concentration, which was used in amount in excess of that equivalent to the ester. A small amount of commercial soap was added to the reaction mixture to effect dispersion. The mixture was then refluxed for 20 minutes in order to effect the interaction rapidly. Following refluxing, the mixture was steam distilled. The distillate was condensed. The aqueous phase of the distillate was separated from the liquid phase, insoluble therein. Approximately an 80 per cent yield of $(CH_3)_3SiCH_2OH$ was obtained. This alcohol had the following properties: a boiling point of 121.7–121.9 at 751 mm., an index of refraction of 1.4169 at 25° C., a density of 0.8261 at 25° C. and a molar refraction of 31.71.

*Example 2*

The ester described in Example 1 was subjected to alcoholysis. In order to effect this reaction the ester was mixed with 10 equivalents of absolute methyl alcohol per equivalent of the ester. To the mixture there was added 0.05 weight per cent of concentrated sulphuric acid. The mixture was allowed to stand at room temperature for two days. There was then distilled from the reaction mixture the azeotrope of methanol and methyl acetate. Methanol was again added to the reaction mixture. After 4 days at room temperature, further amounts of the azeotrope were removed by distillation. The product was then purified by distillation at atmospheric pressure. By this means a yield of the trimethylsilyl methanol, identical to that described in Example 1, was recovered in amount equivalent to 80 per cent of theory.

*Example 3*

The method of Example 2 was repeated employing hydrochloric acid in place of sulphuric acid. The same result was obtained.

*Example 4*

290 parts by weight of bis-chloromethyldimethylsilane, 412 parts of anhydrous potassium acetate and 312 parts of glacial acetate acid were charged into a pressure autoclave. The autoclave was shaken for 4 hours at 118° to 130° C. and for 16 hours at 148° to 160° C. The contents of the autoclave were discharged, washed with water to remove salts and acid. Upon distillation a yield of 338.5 parts of product were obtained representing a yield equal to 90% of theory. This product was bis-acetoxymethyldimethylsilane $(CH_3)_2Si(CH_2OOCCH_3)_2$. This product had a boiling point of 124° C. at 27 mm., an index refraction at 25° C. of 1.4309 to 1.4310, a specific gravity at 25° C. of 1.1035 and a molar refraction of 52.17. The saponification equivalent of the product was found to be 102.

This ester was subjected to alcoholysis under the conditions stated in Example 2 but using hydrochloric acid at a concentration of about 0.01 weight per cent based on the reaction mixture. The azeotrope was removed periodically as described, with the addition of fresh methanol. The azeotrope finally was removed by distillation at atmospheric pressure and excess methanol was removed by distillation under vacuum at room temperature.

The residue which was found to be $$(CH_3)_2Si(CH_2OH)_2$$

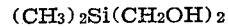

was non-volatile at room temperature. The properties of this material are as follows: a boiling point of 130° C. at 27 mm., an index of refraction of 1.4611 at 25° C., a specific gravity at 25° C. of 0.993 and a molar refraction of 33.20. The saponification equivalent of the product was 12.7. This product was over 95% pure and is a sparkling viscous liquid completely soluble in water.

*Example 5*

Dichloro(chloromethyl)methylsilane, in amount of 297 grams, was added to 588 grams of potassium acetate in acetic acid solution. The mixture was heated under reflux for 16 hours. The product so obtained was distilled whereby acetic anhydride was removed therefrom. The product was washed with water to remove residual acid and salts. A high polymer was thereby produced which had the formula $(CH_3COOCH_2SiCH_3O)_n$. When this polymer was heated, exposed to air for 62 hours at 150° C., there was observed no loss of weight therefrom. The polymer had an index of refraction at 25° C. of 1.4428 and a viscosity at 25° C. of 136.7 centistokes and at 3.3° C. of 403 centistokes. This polymer, in amount of 210 grams, was added to 800 ml. of methanol and five drops of concentrated hydrochloric acid in order to convert the acetoxymethyl substituents to hydroxymethyl substituents. A methyl alcohol-methyl acetate azeotrope was removed by distillation and residual methyl alcohol removed by distillation under vacuum. 210 ml. of a polymer were obtained which corresponded to the formula $(HOCH_2SiCH_3O)_n$. When this polymer was heated in a flask, a material was obtained which was resilient but which would flow gradually at room temperature. When the hydroxymethyl polymer was coated on sheet metal and heated for one hour at 95°, a tough resilient coating was formed. The hydroxymethyl polymer without heating was successfully employed for preventing the foaming of hydrocarbon oils and of aqueous organic systems.

That which is claimed is:

1. Compositions of the general formula $R_nSi(CH_2OH)_{4-n}$ in which R represents hydrocarbon radicals of the group consisting of alkyl and monocyclicaryl radicals and $n$ represents an integer from 1 to 3.
2. $(CH_3)_2Si(CH_2OH)_2$.
3. $(CH_3)_3SiCH_2OH$.

JOHN LEOPOLD SPEIER, Jr.

REFERENCES CITED

The following references are of record in the file of this patent:

Gold et al.: "Jour. Am. Chem. Soc.," vol. 70 (1948), pages 2874–2876.

Speier et al.: "Jour. Am. Chem. Soc.," vol 70 (1948), pages 1117–1119.

Volnov: "Jour. Gen. Chem." (U. S. S. R.), vol. 10 (1940), pages 1600–1604.

Niedzielski: "Jour. Am. Chem. Soc.," vol. 69 (1940), page 3519.